(12) United States Patent
Riesberg

(10) Patent No.: US 7,348,683 B2
(45) Date of Patent: Mar. 25, 2008

(54) ROTOR FOR A WIND ENERGY TURBINE

(75) Inventor: André Riesberg, Wallenhorst (DE)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 11/283,316

(22) Filed: Nov. 17, 2005

(65) Prior Publication Data

US 2007/0108770 A1 May 17, 2007

(51) Int. Cl.
*F03D 9/00* (2006.01)
(52) U.S. Cl. .......................... 290/1 R; 290/44; 290/55; 416/1
(58) Field of Classification Search ................ 290/1 R, 290/1 A, 43, 44, 54, 55; 416/1, 39
See application file for complete search history.

(56) References Cited

U.S. PATENT DOCUMENTS

| | | | |
|---|---|---|---|
| 4,700,081 A * | 10/1987 | Kos et al. ..................... 290/44 |
| 5,148,711 A * | 9/1992 | Twerdochlib et al. ......... 73/660 |
| 5,644,075 A * | 7/1997 | Hefer ........................... 73/147 |
| 5,835,996 A | 11/1998 | Hashimoto et al. |
| 6,504,258 B2 | 1/2003 | Schultz et al. |
| 6,535,135 B1 | 3/2003 | French et al. |
| 6,559,550 B2 | 5/2003 | Herman |
| 6,655,035 B2 | 12/2003 | Ghandi et al. |
| 6,737,789 B2 | 5/2004 | Radziemski et al. |
| 6,765,363 B2 | 7/2004 | LaFollette et al. |
| 6,768,214 B2 | 7/2004 | Schultz et al. |
| 6,890,152 B1 * | 5/2005 | Thisted ........................ 416/1 |
| 7,086,834 B2 * | 8/2006 | LeMieux ...................... 416/1 |

\* cited by examiner

*Primary Examiner*—Nicholas Ponomarenko
(74) *Attorney, Agent, or Firm*—Armstrong Teasdale LLP

(57) ABSTRACT

A the rotor for a wind energy turbine includes a hub and at least one rotor blade connected to the hub. The rotor also includes comprises at least one sensor for sensing at least one physical value of the rotor, e.g. mechanical stress, and a power supply for supplying electrical power to the at least one sensor. The power supply includes an electromechanical converter for converting mechanical energy from vibrations of the rotor when subjected to wind loads, e.g. during operation of the wind energy turbine, into electrical energy for supplying to the at least one sensor.

14 Claims, 2 Drawing Sheets

ROTOR FOR A WIND ENERGY TURBINE

BACKGROUND OF THE INVENTION

The present invention relates to a rotor for a wind energy turbine and, more specifically, to an autonomous power supply for at least one sensor located at the rotor for sensing at least one physical value of the rotor as well as a method for autonomously supplying electrical energy to at least one sensor arranged at the rotor of a wind energy turbine for sensing at least one physical value of the rotor.

Modern wind energy turbines are provided with a plurality of different sensors for observing the current physical properties and characteristics of the wind energy turbine during its operation. Some of the sensors are arranged on the blades of the rotor of the wind energy turbine, e.g. for measuring the physical stress the rotor blade is subjected to. In order to supply the sensors with electrical energy, provision of corresponding cables is necessary. Also for transmitting the sensed data or measurement values, additional cables are necessary. Providing electrical energy to the sensors via cables is not desirable because the cables are disadvantageous with respect to lightning strikes or the like.

BRIEF DESCRIPTION OF THE INVENTION

In one aspect, the present invention provides for a rotor for a wind energy turbine, including a hub and at least one rotor blade connected to the hub, at least one sensor for sensing at least one physical value of the rotor, e.g. mechanical stress or the like, and a power supply for supplying electrical power to the at least one sensor. The power supply comprises an electromechanical converter for converting mechanical energy from vibrations of the rotor when subjected to wind loads, e.g. during operation of the wind energy turbine, into electrical energy for supplying to the at least one sensor.

In a further aspect of the present invention, there is provided a method for autonomously supplying electrical energy to at least one sensor arranged at a rotor of a wind energy turbine for sensing at least one physical value of the rotor. The method includes the steps of converting mechanical energy from vibrations of the rotor when subjected to wind loads, e.g. during operation of the wind energy turbine, into electrical energy, and supplying the electrical energy to the at least one sensor.

DETAILED DESCRIPTION OF THE INVENTION

One embodiment of the present invention uses the vibrations of the rotor of the wind energy turbine and, in particular, of the blades of the rotor for converting the mechanical energy, such as the vibrations, into electrical energy. Accordingly, a rotor of a wind energy turbine includes an electromechanical converter which can be e.g. an electromagnetic or piezoelectric vibration converter for converting mechanical energy from the vibrations of the rotor when subjected to wind loads into electrical energy to be supplied to at least one sensor which senses at least one physical value of the rotor, e.g. mechanical stress or the like acting on the rotor blade. This autonomous electrical energy supply eliminates the need for power supply cables in the rotor. Electromechanical converters for converting mechanical energy into electrical energy are known in the art. Typically, those converters are designed as MEMS (Micro Electrical Mechanical Systems) and are made using semiconductor technologies.

In a further aspect, the autonomous power supply further comprises an energy storing capacitor means or a rechargeable battery as a back-up energy source.

Moreover, according to another aspect of the present invention, a data storage means is provided for storing the physical values sensed by the at least one sensor. The power supply provides power to the data storage means. Moreover, an interrogation means for interrogating the data storage means e.g. either electromagnetically or optically is provided. The power supply provides power to the interrogation means. The interrogation means makes it possible to read the stored physical values of the data storage means either online or offline. If the interrogation means operates electromagnetically, a transponder or the like is provided at the location of the sensor, which transponder can be initiated from outside in order to transmit the stored physical values or which transponder transmits the stored physical values on its own.

In the embodiment that the interrogation means operates optically, an electro optical converter is provided for converting the electrical signals from the data stored in the data storage means into an optical signal to be transmitted via an optical fiber to another location of the wind energy turbine or outside thereof.

To protect the sensor including the power supply and, if provided, data storage means and interrogation means, against damages due to high electric, or magnetic, or electromagnetic field concentrations, the sensor system is accommodated in a metallic casing or a casing having a wall which comprises at least one metallic layer. Such a casing provides EMC shielding to the sensor system.

Figure 1:
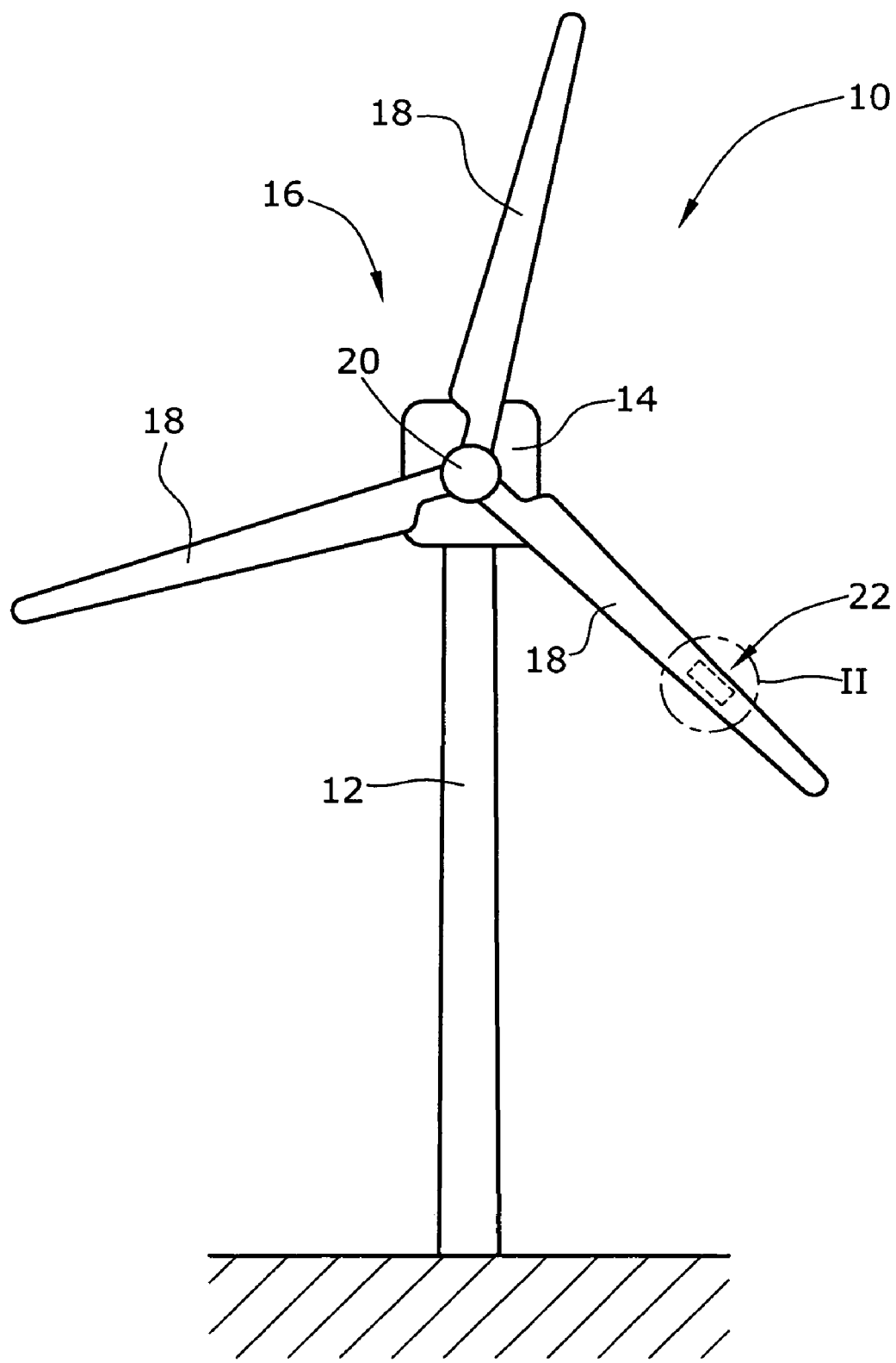
FIG. 1 illustrates a wind energy turbine in which the rotor blades are provided with sensors having autonomous power supplies.

In particular illustrates FIG. 1 shows the main components of a wind energy turbine 10 including a tower 12 for supporting a nacelle 14 rotatable around a vertical axis. A rotor 16 is mounted at the nacelle 14 so as to rotate around a horizontal axis. In this embodiment, the rotor 16 comprises three rotor blades 18 connected to a hub 20 of rotor 16. It is to be noted that the invention is not restricted to horizontal type rotors like the one shown in FIG. 1 and is also applicable to rotors rotating around a vertical axis. Also the number of the blades of the rotor is not critical for the invention. Accordingly, the invention can be used for each type of rotor known in the art of wind energy turbines.

Figure 2:
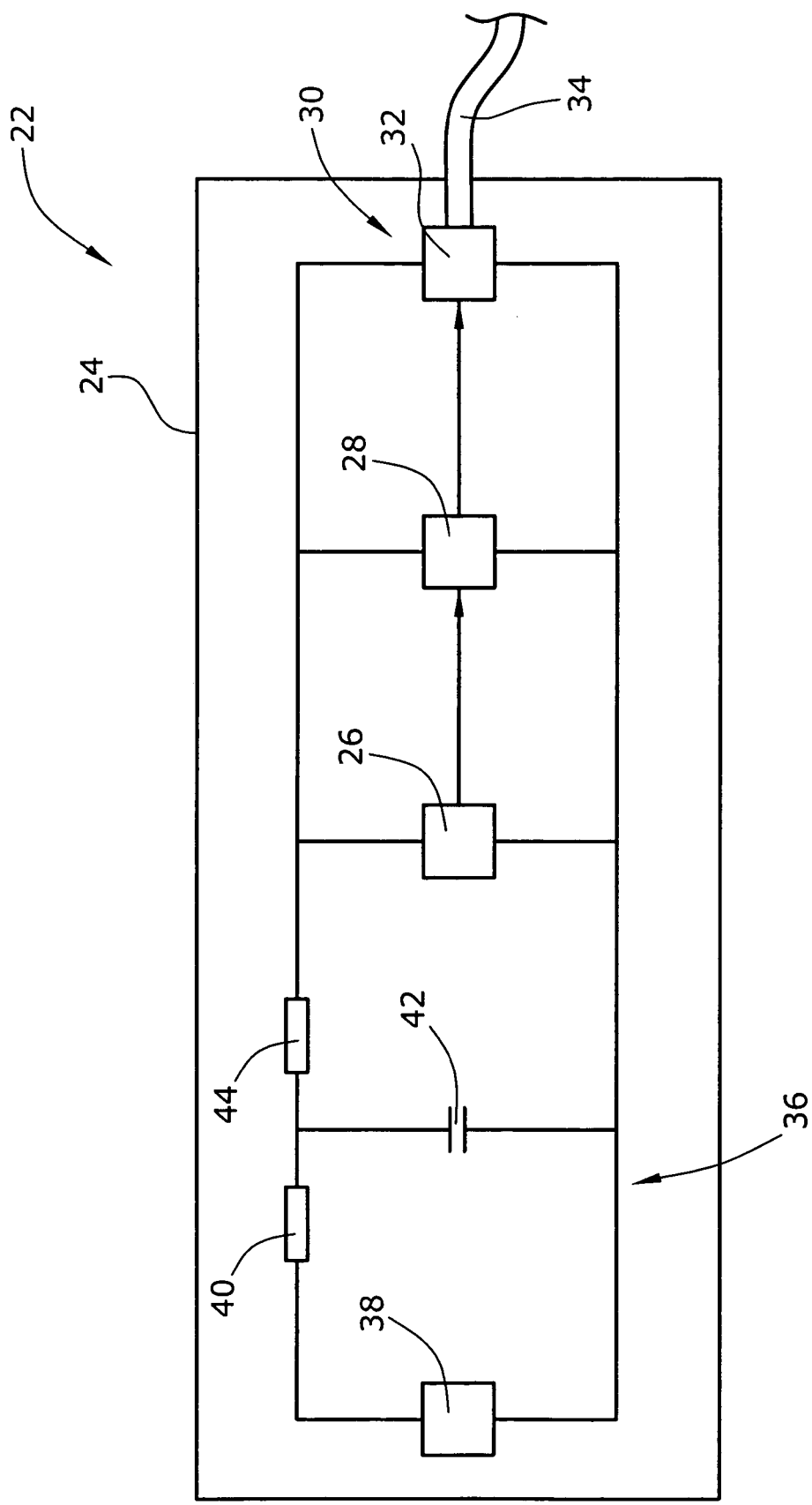
FIG. 2 is a schematic diagram of the circuitry of a sensor system located in at least one of the rotor blades of the wind energy turbine.

As shown in FIG. 1, at least one rotor blade 18 is provided with a sensor system 22 the construction and electric circuitry of which is shown in more detail in FIG. 2. Sensor system 22 is used to sense the mechanical stress the rotor blade is subjected to due to wind loads or other aerodynamic loads.

Sensor system 22 according to FIG. 2 provides an EMC shielding casing 24 having a wall including metallic material. Within casing 24 there is arranged a sensor 26 for measuring and sensing mechanical stresses of rotor blade 18. The measurement signals sensed by sensor 26 are stored in a data storage means 28 provided as an IC chip or the like although other types of data storage means can also be used. The control system for controlling sensor 26 and data storage means 28 in order to store data into and read data from data storage means 28 is not shown in FIG. 2. An interrogation means 30 of sensor system 22 includes an electro optical converter 32 for converting the electrical signals read from the data storage means 28 into optical signals to be transmitted via an optical cable 34. Accordingly, it is possible to read data from the data storage means 28 without using electric cables or the like outside sensor system 22. This configuration is advantageous in that high electric and magnetic field concentrations, for example a lightning strikes, cannot damage sensor system 22 because the field concentrations cannot be transmitted via optical cable 34 and due to metallic casing 24 around optical system 22.

One aspect of the present invention pertains to the power supply of sensor system 22. Sensor system 22 is provided with an autonomous power supply 36 which uses electrical energy converted from mechanical energy to be supplied to the sensor 26, the data storage means 28, and the interrogation means 30 including the electro optical converter. The autonomous power supply 36 includes an electromechanical converter 38 which converts the mechanical energy from vibrations of the rotor into electrical energy. A suitable electromechanical converter can be an electromagnetic or piezoelectric vibration converter. The converter 38 is connected via a resistor 40 to a storage capacitor 42 and, optionally, to a rechargeable battery (not shown) so as to store electrical energy converted by converter 38 for later use for supplying the energy to sensor 26 and the other electric components of sensor system 22. Power supply 36 is connected via a further resistor 44 to the remaining electrical components of sensor system 22 as shown in FIG. 2.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A rotor for a wind energy turbine, comprising:
a hub and at least one rotor blade connected to said hub;
at least one sensor for sensing at least one physical value of said rotor; and
a power supply for supplying electrical power to said at least one sensor, said power supply comprising an electromechanical converter for converting mechanical energy from vibrations of said rotor when subjected to wind loads, into electrical energy for supplying to said at least one sensor.

2. A rotor according to claim 1 wherein said power supply further comprises at least one of an energy storing capacitor means or a rechargeable battery connected to said electromechanical converter and said at least one sensor.

3. A rotor according to claim 1 wherein said electromechanical converter is at least one of and an electromagnetic piezoelectric vibration converter.

4. A rotor according to claim 1 further comprising a data storage means for storing the physical values sensed by the at least one sensor and an interrogation means for interrogating the data storage means.

5. A rotor according to claim 4 wherein said interrogation means comprises an electro optical converter for converting an electrical signal from the data stored in said data storage means into an optical signal to be transmitted via an optical fiber to another location of the wind energy turbine or outside thereof.

6. A rotor according to claim 1 wherein said at least one sensor and said electromechanical converter are located in a common housing.

7. A rotor according to claim 5 wherein said data storage means and said electro optical converter are arranged in the common housing.

8. A rotor according to claim 6 wherein said data storage means and said electro optical converter are arranged in the common housing.

9. Method for supplying electrical energy to a sensor for a rotor of a wind energy turbine, said method comprising the steps of:
converting mechanical energy from vibrations of the rotor when subjected to wind loads, into electrical energy; and
supplying the electrical energy to the sensor.

10. A method according to claim 9 wherein the step of supplying the electrical energy to the sensor comprises storing the electrical energy in an electrical energy storing means for supplying the electrical energy to the sensor.

11. A method according to claim 9 further comprising the sensor sensing at least one physical value, and storing the at least one physical value in a data storage means.

12. A method according to claim 10 further comprising the sensor sensing at least on physical value, and storing the physical values in a data storage means.

13. A method according to claim 11 further comprising interrogating the data storage means and transmitting the data from the data storage means by means of an electromagnetic or optical signal to another location.

14. A method according to claim 12 further comprising interrogating the data storage means and transmitting the data from the data storage means by means of an electromagnetic or optical signal to another location.

* * * * *